United States Patent
Zhao et al.

(10) Patent No.: US 9,832,031 B2
(45) Date of Patent: Nov. 28, 2017

(54) BIT INDEX EXPLICIT REPLICATION FORWARDING USING REPLICATION CACHE

(71) Applicant: Futurewei Technologies, Inc., Plano, TX (US)

(72) Inventors: Katherine Zhao, San Jose, CA (US); Lucy Yong, Georgetown, TX (US)

(73) Assignee: Futurewei Technologies, Inc., Plano, TX (US)

( * ) Notice: Subject to any disclaimer, the term of this patent is extended or adjusted under 35 U.S.C. 154(b) by 98 days.

(21) Appl. No.: 14/921,835

(22) Filed: Oct. 23, 2015

(65) Prior Publication Data

US 2016/0119159 A1    Apr. 28, 2016

Related U.S. Application Data

(60) Provisional application No. 62/068,507, filed on Oct. 24, 2014.

(51) Int. Cl.

| | |
|---|---|
| *H04L 12/18* | (2006.01) |
| *H04L 12/54* | (2013.01) |
| *H04L 12/761* | (2013.01) |
| *H04L 12/801* | (2013.01) |
| *H04L 12/721* | (2013.01) |
| *H04L 12/26* | (2006.01) |

(52) U.S. Cl.
CPC ........ *H04L 12/1854* (2013.01); *H04L 12/189* (2013.01); *H04L 43/0811* (2013.01); *H04L 45/16* (2013.01); *H04L 45/26* (2013.01); *H04L 47/15* (2013.01); *H04L 47/17* (2013.01)

(58) Field of Classification Search
CPC ............... H04L 12/185; H04L 12/1854; H04L 12/5679; H04L 12/5689; H04L 45/16; H04L 47/10; H04L 49/90
See application file for complete search history.

(56) References Cited

U.S. PATENT DOCUMENTS

| | | | |
|---|---|---|---|
| 7,310,335 B1 * | 12/2007 | Garcia-Luna-Aceves | H04L 12/185 370/390 |
| 8,804,723 B2 * | 8/2014 | Gulati | H04L 45/16 370/390 |

(Continued)

OTHER PUBLICATIONS

Wijnands, Ed., et al., "Multicast Using Bit Index Explicit Replication," draft-ietf-bier-architecture-01, Jun. 25, 2015, 35 pages.

(Continued)

*Primary Examiner* — Alpus H Hsu
(74) *Attorney, Agent, or Firm* — Conley Rose, P.C.

(57) ABSTRACT

A data packet forwarding method including receiving, by a network node, a data packet that comprises a bit string, a BFIR identifier (ID), and a multicast replication path (MRP) ID, wherein the BFIR ID identifies an ingress network node for a multicast group, and wherein the MRP ID identifies the multicast group, identifying an entry in a BIER Replication Path Cache Table (BRCT) using the BFIR ID and the MRP ID, wherein the entry identifies a replication neighbor (NBR) list associated with the BFIR ID and the MRP ID, and forwarding the data packet in accordance with the replication NBR list.

20 Claims, 6 Drawing Sheets

(56) References Cited

U.S. PATENT DOCUMENTS

| | | | |
|---|---|---|---|
| 8,908,686 B1* | 12/2014 | Ghosh | F02B 37/12 370/390 |
| 9,571,897 B2* | 2/2017 | Shepherd | H04L 12/18 |
| 2015/0078377 A1* | 3/2015 | Wijnands | H04L 12/1886 370/390 |
| 2015/0078378 A1* | 3/2015 | Wijnands | H04L 12/1886 370/390 |
| 2015/0131659 A1* | 5/2015 | Wijnands | H04L 45/16 370/390 |
| 2015/0138961 A1* | 5/2015 | Wijnands | H04L 41/0668 370/228 |
| 2016/0087890 A1* | 3/2016 | Przygienda | H04L 45/16 370/255 |

OTHER PUBLICATIONS

Wijnands, Ed., et al., "Multicast Using Bit Index Explicit Replication," draft-ietf-bier-architecture-00, Sep. 22, 2014, 24 pages.

Wijnands, Ed., et al., "Encapsulation for Bit Index Explicit Replication in MPLS Networks," draft-wijnands-mpls-bier-encapsulation-00, Sep. 22, 2014, 10 pages.

\* cited by examiner

BIT INDEX EXPLICIT REPLICATION FORWARDING USING REPLICATION CACHE

CROSS-REFERENCE TO RELATED APPLICATIONS

The present application claims benefit of U.S. Provisional Patent Application No. 62/068,507 filed Oct. 24, 2014 by Katherine Zhao, et al., and entitled, "Bit Index Explicit Forwarding Using Replication Cache," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Bit Index Explicit Replication (BIER) is a multicast solution that is proposed by Internet Engineering Task Force (IETF) draft titled, "Multicast using Bit Index Explicit Replication," by I J. Wijnands, et al., published on Sep. 22, 2014 and, IETF draft titled, "Encapsulation for Bit Index Explicit Replication in MPLS Networks," by I J. Wijnands, et al., published on Sep. 22, 2014, which are both hereby incorporated by reference as if reproduced in their entirety. A BIER domain is built on top of Interior Gateway Protocol (IGP). The BIER domain requires that BIER Forwarding Routers (BFRs) use bit string information from BIER packets in order to compute replication paths locally. BFRs are also required to modify the bit string on the packet prior to forwarding the packet to the next-hop BFR.

A bit string is created by a BIER Forwarding Ingress Router (BFIR) that is attached to a multicast source. A BIER packet header may be read using the bit string to capture an egress router's address information. BFRs use the bit string information to calculate a replication path, to modify the bit string, and to forward the packet to a next-hop BFR until a data packet is transmitted from the BFIR to the BIER Forwarding Egress Routers (BFERs). For example, the bit string can be modified to prevent looping and duplication by ensuring the bit string comprises only BFERs that the next-hop BFR needs to forward towards. BIER does not require an explicit tree-building protocol for multicasting and does not require intermediate nodes to maintain per-flow states.

When a multicast data packet enters a BIER domain, the ingress router (e.g., BFIR) determines the set of egress routers (e.g., BFERs), encapsulates the packet in a BIER header, and transmits the packet to its adjacent BFR. The adjacent BFR will determine the destination BFERs and the next-hop adjacency for each of the BFERs. For example, the adjacent BFR will look up a bit string, a multiprotocol label switching (MPLS) label, and underlay network information. The adjacent BFR will also make a copy of the packet, clear the bit string, modify the BIER header, and transmit the packet to the next-hops. Every packet transmitted over a BIER domain is inspected and modified on each BFR prior to forwarding the packet to the next-hop. The repeated inspection and modifications on each BFR are time consuming, waste resources, reduce multicast transport speeds, and degrade network performance.

SUMMARY

In one embodiment, the disclosure includes a data packet forwarding method comprising receiving, by a network node, a data packet that comprises a bit string, a BFIR identifier (ID), and a multicast replication path (MRP) ID, wherein the BFIR ID identifies an ingress network node for a multicast group, and wherein the MRP ID identifies the multicast group, identifying, by the network node, an entry in a BIER Replication Path Cache Table (BRCT) using the BFIR ID and the MRP ID, wherein the entry identifies a replication neighbor (NBR) list associated with the BFIR ID and the MRP ID, and forwarding, by the network node, the data packet in accordance with the replication NBR list.

In another embodiment, the disclosure includes a data packet forwarding method comprising receiving, by a network node, a control packet that comprises a bit string, a BFIR ID, and an MRP ID, wherein the BFIR ID identifies an ingress network node for a multicast group, wherein the MRP ID identifies the multicast group, and wherein the control packet does not comprise a multicast payload, generate, by the network node, an entry in a BRCT using the BFIR ID and the MRP ID, wherein the entry identifies an NBR list associated with the BFIR ID and the MRP ID, and receiving, by a network node, a data packet that comprises the MRP ID, forwarding, by the network node, the data packet in accordance with the entry in the BRCT.

In yet another embodiment, the disclosure includes a data packet forwarding method comprising obtaining, by a network node, a BFIR ID and an MRP ID, wherein the BFIR ID identifies an ingress network node for a multicast group, and wherein the MRP ID identifies the multicast group, generating, by the network node, an index for an entry in a BRCT using the BFIR ID and the MRP ID, and generating, by the network node, the entry in the BRCT that comprises the index and a replication NBR list associated with the index, wherein the replication NBR list identifies one or more next-hop network nodes.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for transporting multicast traffic over a network (e.g., a Software Defined Network (SDN) network) using a BRCT. In an embodiment, a BFR is configured to use a BRCT to store computed replication paths for a flow and to apply the computed replication paths to other BIER packets in the same flow. Entries in a BRCT are derived from a bit string of a BIER header for a data packet. Each new multicast flow is assigned a multicast group identifier. Data packets for the same multicast flow are forwarded to the next-hop based on the BRCT. BFRs do not need to modify the bit string for data packets with the same destination BFERs for the same multicast flow. Fewer data packets may need BIER header modifications which can improve transport performance. Reducing BIER packet inspection and modification time for a large percentage of the data packets may result in improved BIER packet process performance. Using BRCTs also enables the network to separate BIER into a control plane and a data plane using existing hardware.

Figure 1:
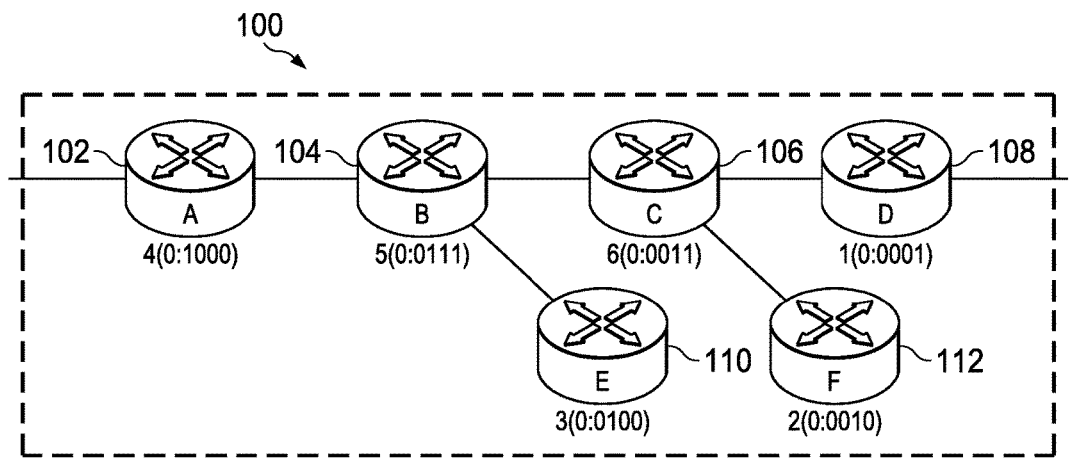
FIG. 1 is a schematic diagram of an embodiment of a network implementing BIER.

FIG. 1 is a schematic diagram of an embodiment of a network 100 implementing BIER. Network 100 is configured to implement a BIER domain and to use a BIER protocol for transporting data packets. Network 100 comprises a plurality of network nodes 102, 104, 106, 108, 110, and 112 in data communication with each other. The network nodes 102-112 may be switches, routers, bridges, and/or any other device used to transport packets through a network. The network nodes 102-112 may be coupled to each other using one or more tunnels or links. Examples of tunnels include, but are not limited to, MPLS tunnels and virtual extensible local area network (VxLAN) tunnels. Links may include physical links, such as electrical and/or optical links, and/or logical links (e.g., virtual links).

Each of the network nodes 102-112 is assigned a set identifier (SI) and a bit string value. For example, network node 102 is assigned an SI value of 4 and a bit string value of 0:1000, network node 104 is assigned an SI value of 5 and a bit string value of 0:0111, network node 106 is assigned an SI value of 6 and a bit string value of 0:0011, network node 108 is assigned an SI value of 1 and a bit string value of 0:0001, network node 110 is assigned an SI value of 3 and a bit string value of 0:0100, and network node 112 is assigned an SI value of 2 and a bit string value of 0:0010.

Network node 102 is configured as a BFIR, network nodes 104 and 106 are configured as BFRs, and network nodes 108-112 are configured as BFERs for the BIER domain. A BFIR is in data communication with a multicast source and is configured to assign an MRP ID for a multicast group and to encode the MRP ID into a BIER header, for example, BIER header 300 in FIG. 3. Using replication cache, a BIER based control plane may be used to establish point-to-multipoint (P2MP) label switched paths (LSPs) where an upstream BFR assigns a label as an MRP ID. Each BFR is configured to calculate the next-hop BFR and to generate a forwarding entry using the MRP ID as the key or index in a BRCT when a BIER header comprises control information. Labels are swapped at each BFR in the data plane. A BFR may also be configured to compute or assign an MRP ID for each multicast group.

When a data packet arrives in the BIER domain, the BFIR is configured to compute an MRP ID and to insert the MRP ID into the BIER header. Each multicast group (*, G) is mapped to an MRP ID. Some multicast groups may be mapped to the same MRP ID, for example, when a bit string is aggregated. Each BFR is configured to maintain a BRCT that comprises a BIER flow identifier (e.g., MRP ID) and a BIER replication NBR list. A BFR is configured to compute the replication path based on the bit string and a BIER next-hop routing table and to generate a replication NBR list that corresponds with a BFIR ID and a MRP ID. The replication NBR list is saved as an entry in the BRCT. The BRCT is programmed into the data plane and is used to forward packets. In an embodiment, the BIER domain is configured to employ a separate control plane and a data plane. Data packets with a bit string (e.g., a packet with no multicast payload) may be used as control plane packets. Control plane packets may be used to generate a BRCT for forwarding other data packets.

Figure 2:
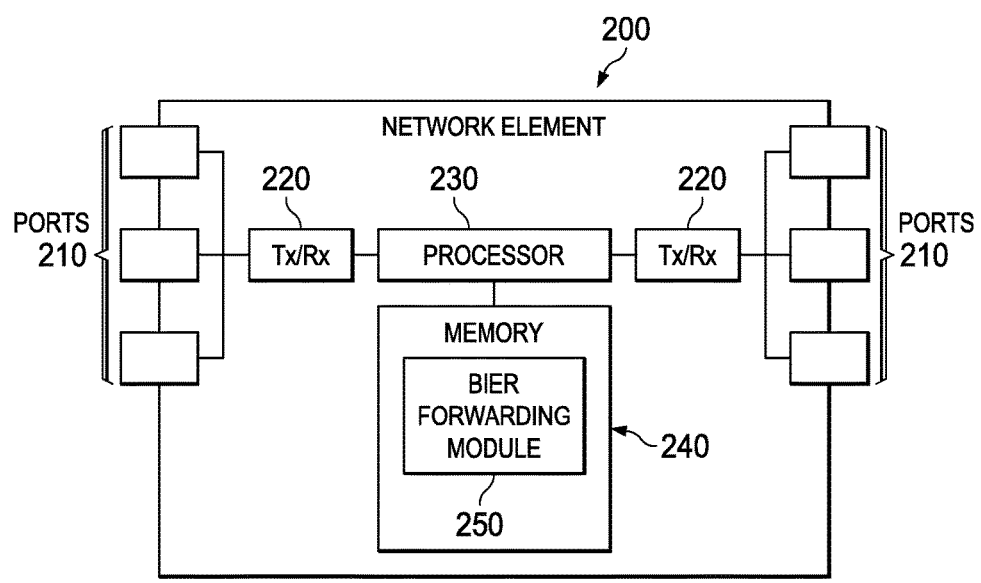
FIG. 2 is a schematic diagram of an embodiment of a network element.

FIG. 2 is a schematic diagram of an embodiment of a network element 200. The network element 200 may be suitable for implementing the disclosed embodiments. Network element 200 may be any device (e.g., a modem, a switch, router, bridge, server, client, controller, etc.) that transports or assists with transporting data through a network, system, and/or domain. For example, network element 200 may be implemented in network nodes 102-112 in FIG. 1. Network element 200 comprises ports 210, transceiver units (Tx/Rx) 220, a processor 230, and a memory 240 comprising a BIER forwarding module 250. Ports 210 are coupled to Tx/Rx 220, which may be transmitters, receivers, or combinations thereof. The Tx/Rx 220 may transmit and receive data via the ports 210. Processor 230 is operably coupled to the Tx/Rx 220 and is configured to process data. Memory 240 is operably coupled to processor 230 and is configured to store data and instructions for implementing embodiments described herein. The network element 200 may also comprise electrical-to-optical (EO) components and optical-to-electrical (OE) components coupled to the ports 210 and Tx/Rx 220 for receiving and transmitting electrical signals and optical signals.

The processor 230 may be implemented by hardware and software. The processor 230 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 230 is in communication with the ports 210, Tx/Rx 220, and memory 240.

The memory 240 comprises one or more of disks, tape drives, or solid-state drives and may be used as an over-flow data storage device, to store programs when such programs are selected for execution, and to store instructions and data that are read during program execution. The memory 240 may be volatile and non-volatile and may be read-only memory (ROM), random-access memory (RAM), ternary content-addressable memory (TCAM), or static random-access memory (SRAM). BIER forwarding module 250 is implemented by processor 230 to execute the instructions for generating entries in a BRCT and transporting multicast traffic over a network using the BRCT. BIER forwarding module 250 is configured to implement method 800 in FIG. 8 and method 900 in FIG. 9. The inclusion of BIER forwarding module 250 provides an improvement to the functionality of network element 200. BIER forwarding module 250 also effects a transformation of network element 200 to a different state. Alternatively, BIER forwarding module 250 is implemented as instructions stored in the processor 230.

Figure 3:
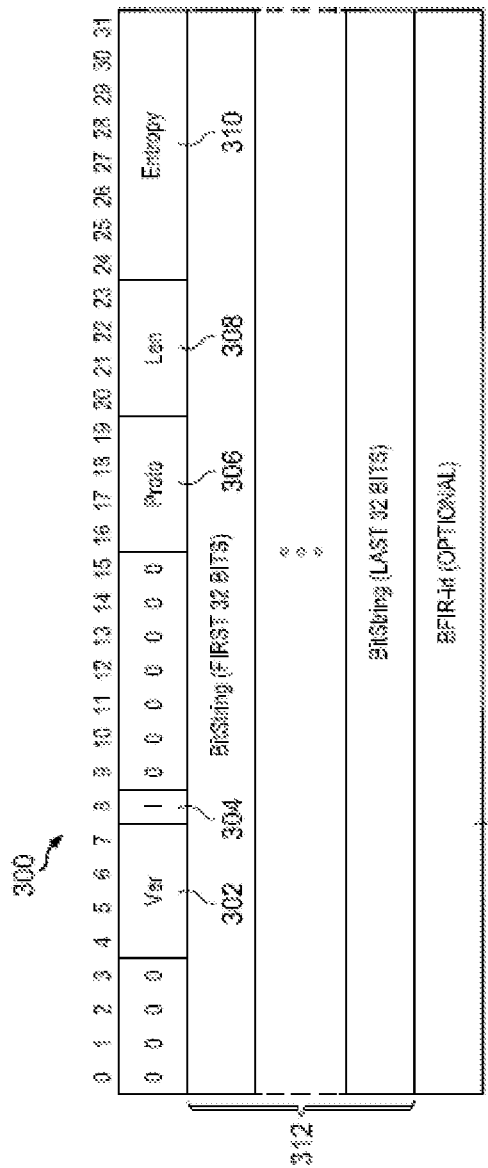
FIG. 3 is a schematic diagram of an embodiment of a BIER header.

FIG. 3 is a schematic diagram of an embodiment of a BIER header 300 which may be employed for routing data packets in a BIER domain, for example, between network nodes 102-112 in FIG. 1. The BIER header 300 may be used within an existing BIER packet as described in IETF draft titled, "Multicast using Bit Index Explicit Replication," by I J. Wijnands, et al., published on Sep. 22, 2014 and, IETF draft titled, "Encapsulation for Bit Index Explicit Replication in MPLS Networks," by I J. Wijnands, et al., published on Sep. 22, 2014. In an embodiment, the BIER header 300 may be located at the end of an MPLS stack. BIER header 300 comprises a version (Ver) field 302, a flag (I) bit field 304, a protocol (Proto) field 306, a length (Len) field 308, an entropy field 310, a bitstring field 312, and a BFIR identifier (BFIR-id) field 314. The BIER header 300 may be configured as shown or in any suitable manner. The version field 302 may be 4 bits and identifies the version of the BIER header 300. The flag bit field 304 indicates whether the BIER header 300 comprises the BFIR identifier field 314. For example, the BIER header 300 comprises the BFIR identifier field 314 when the flag bit field 304 is set and the BIER header 300 does not comprise the BFIR identifier field 314 when the flag bit field 304 is not set. The protocol field 306 may be 4 bits and identifies the type of payload. For example, the protocol field 306 may indicate that the payload is an MPLS packet with a downstream-assigned label at the top of the stack, an MPLS packet with an upstream-assigned label at the top of the stack, an Ethernet frame, an Internet Protocol (IP) version 4 (IPv4) packet, or, an IP version 6 (IPv6) packet. The length field 308 may be 4 bits and indicates the length of the bit string field 312. The entropy field 310 may be 8 bits and indicates an entropy value that may be used for load balancing. The bit string field 312 identifies the destination BFERs for a data packet. The BFIR identifier field 314 is optional and indicates an identifier associated with the BFIR for the data packet. Additional information for BIER header 300 is described in IETF draft titled, "Encapsulation for Bit Index Explicit Replication in MPLS Networks," by I J. Wijnands, et al., published on Sep. 22, 2014.

In an embodiment, the BIER header 300 may further comprise an MRP ID field, for example, after the entropy field 310 in the BIER header 300, to represent one or more multicast groups. Additionally or alternatively, the BIER header 300 may comprise a second flag bit field to indicate whether a bit string is present in the BIER header 300.

Figure 4:
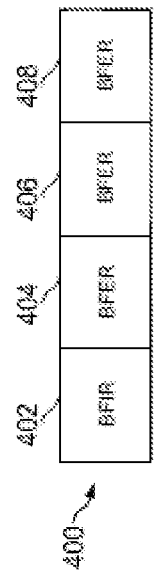
FIG. 4 is a schematic diagram of an embodiment of a bit string.

FIG. 4 is a schematic diagram of an embodiment of a bit string 400 which may be used in a bit string field of a BIER header such as bit string field 312 in BIER header 300 in FIG. 3. The bit string 400 may be used to encode a list of egress network nodes (e.g., BFERs) for a multicast group. BFRs along a path between a BFIR and a BFER may be omitted from the bit string 400. The bit string 400 comprises a plurality of entries 402, 404, 406, and 408 that may each be associated with a BFIR or a BFER. For example, entry 402 may be associated with a BFIR and entries 404, 406, and 408 may each be associated with BFERs for a multicast group. The bit string 400 may have a length of 64 bits, 128 bits, 256 bits, 512 bits, 1024 bits, 2048 bits, 4096 bits, or any other suitable length as would be appreciated by one of ordinary skill upon viewing this disclosure. Additional information for bit string 400 is described in IETF draft titled, "Multicast using Bit Index Explicit Replication," by I J. Wijnands, et al., published on Sep. 22, 2014.

Figure 5:
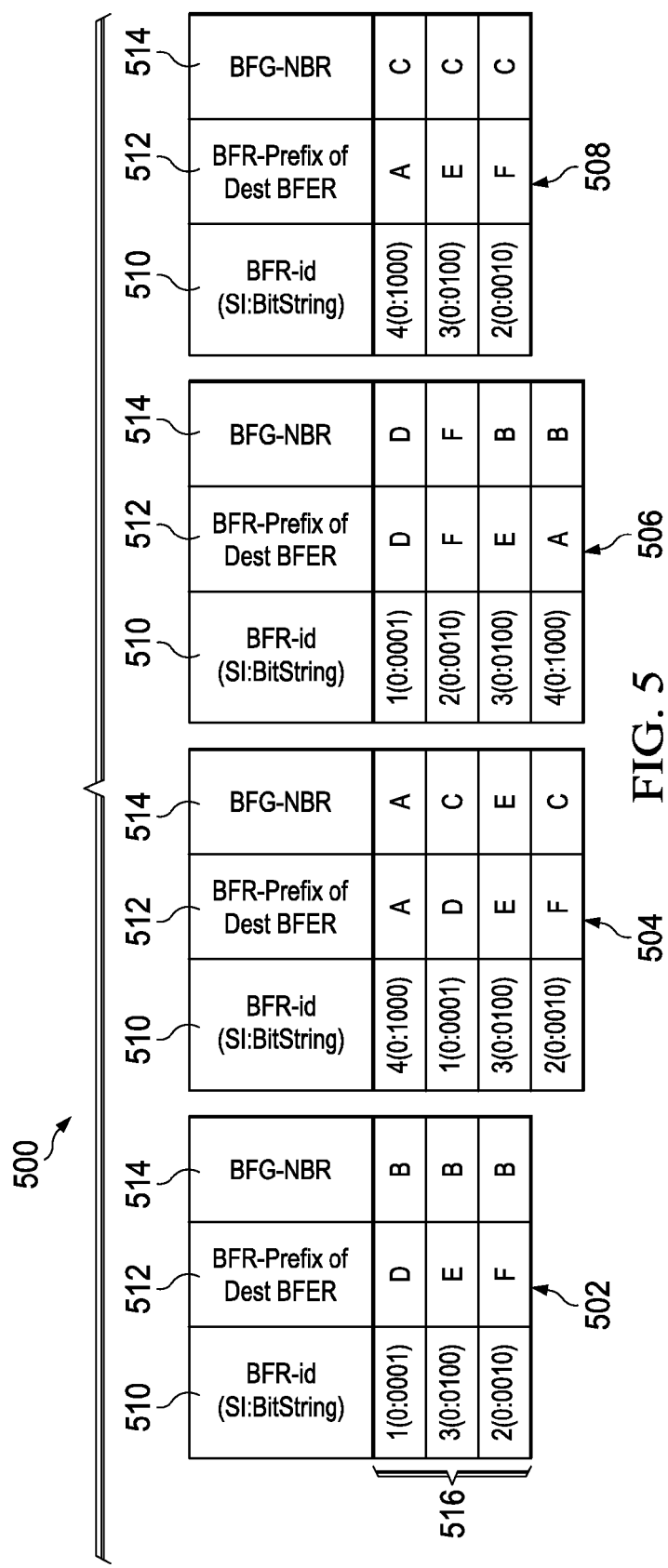
FIG. 5 is a schematic diagram of an embodiment of BIER routing tables.

FIG. 5 is a schematic diagram of an embodiment of BIER routing tables 500. BIER routing tables 500 may be employed in the network nodes in a network implementing BIER such as network 100 in FIG. 1. BIER routing tables 500 map the relationship between a BFER and a BFR neighbor (BFR-NBR) or next-hop along a path towards the BFER. BIER routing tables 500 comprise a first BIER routing table 502, a second BIER routing table 504, a third BIER routing table 506, and a fourth BIER routing table 508. As an example, the first BIER routing table 502 is used by network node 102, the second BIER routing table 504 is used by network node 104, the third BIER routing table 506 is used by network nodes 106, and the fourth BIER routing table 508 is used by network node 108 in FIG. 1. In an embodiment, each of the BIER routing tables 500 comprise one or more entries 516 comprising a BFR identifier (BFR-id) 510, a BFR prefix 512 of a destination BFER, and a BFR-NBR identifier 514. The BFR-id 510 identifies a destination BFER and may be in the format of SI:bit string. Alternatively, the BFR-id 510 may be in any other suitable format as would be appreciated by one of ordinary skill in the art upon viewing this disclosure. The BFR prefix 512 is the BFR prefix of the destination BFER. The BFR-NBR identifier 514 identifies a BFR neighbor or next-hop towards the destination BFER that is identified by the BFR prefix 512. Additional details for BIER routing tables 500 are described in IETF draft titled, "Multicast using Bit Index Explicit Replication," by I J. Wijnands, et al., published on Sep. 22, 2014.

Figure 6:
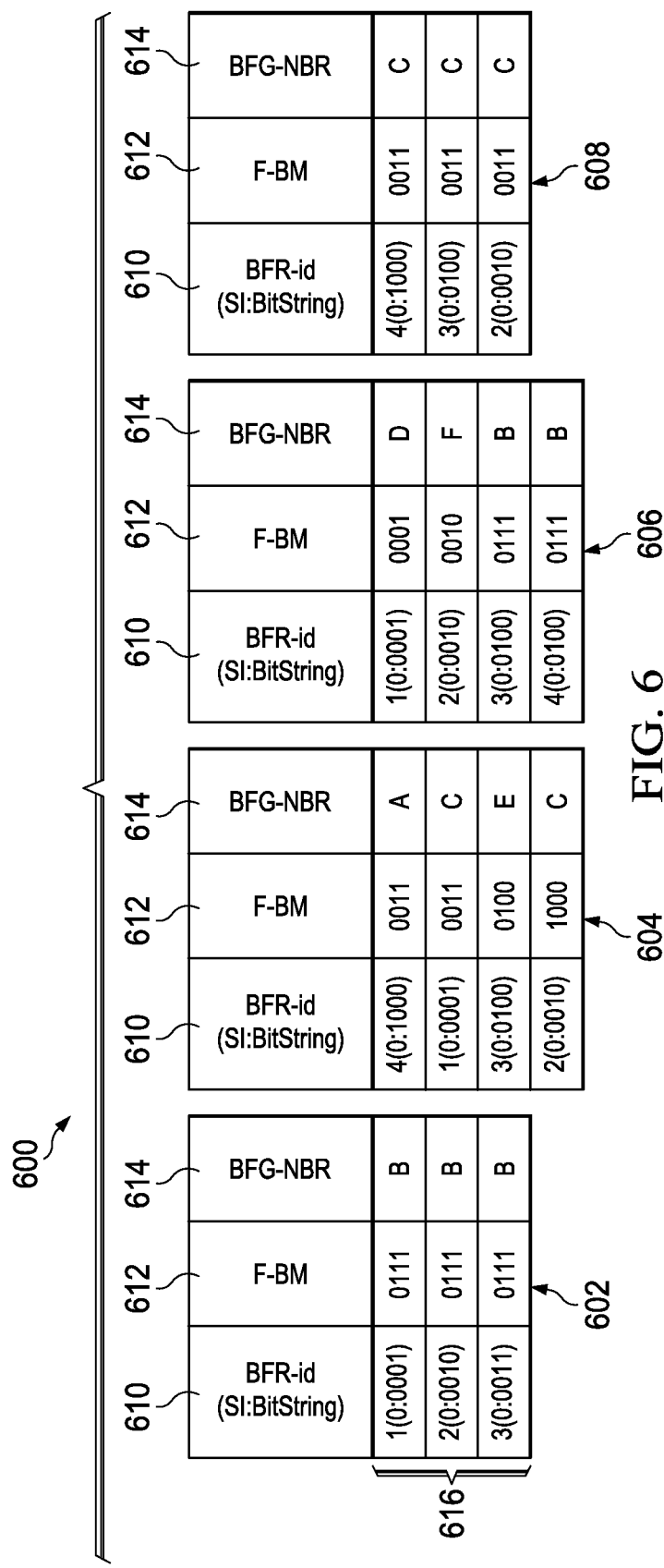
FIG. 6 is a schematic diagram of an embodiment of BIER forwarding tables.

FIG. 6 is a schematic diagram of an embodiment of BIER forwarding tables 600. BIER forwarding tables may be employed in the network nodes in a network implementing BIER such as network 100 in FIG. 1. BIER forwarding tables 600 map the relationship between a BFER and a BFR-NBR or next-hop along a path towards the BFER. BIER forwarding tables 600 may be derived from a BIER routing table, for example, BIER routing tables 500 in FIG. 5. BIER forwarding tables 600 comprise a first BIER forwarding table 602, a second BIER forwarding table 604, a third BIER forwarding table 606, and a fourth BIER forwarding table 608. As an example, the first BIER forwarding table 602 is used by network node 102, the second BIER forwarding table 604 is used by network node 104, the third BIER forwarding table 606 is used by network nodes 106, and the fourth BIER forwarding table 608 is used by network node 108 in FIG. 1. In an embodiment, each of the BIER forwarding tables 600 comprise one or more entries 616 comprising a BFR-id 610, a forwarding bit mask (F-BM) 612, and a BFR-NBR identifier 614. The BFR-id 610 identifies a destination BFER and may be in the format of SI:bit string. Alternatively, the BFR-id 610 may be in any other suitable format as would be appreciated by one of ordinary skill in the art upon viewing this disclosure. The F-BM 612 identifies a bit mask (e.g., bit string) that is associated with a BFR-NBR along the path towards the destination BFER. The BFR-NBR identifier 614 identifies a BFR neighbor or next-hop along the path towards the destination BFER. Additional details for BIER forwarding tables 600 are described in IETF draft titled, "Multicast using Bit Index Explicit Replication," by I J. Wijnands, et al., published on Sep. 22, 2014.

Figure 7:
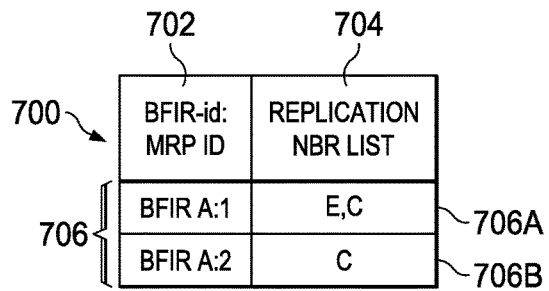
FIG. 7 is a schematic diagram of an embodiment of BIER replication path cache table (BRCT).

FIG. 7 is a schematic diagram of an embodiment of BRCT 700. BRCT 700 may be employed in a network node in a network implementing BIER such as network 100 in FIG. 1. BRCT 700 is programmed onto a network node (e.g., a BFR) and is used for forwarding data packets in the data plane. A network node may use BRCT 700 to keep track of computed replication paths for a flow to apply the computed replication paths to other BIER packets in the same flow. Using BRCT 700 reduces the need for bit string inspection and modifications by a BFR, which improves the BIER packet process performance.

BRCT 700 comprises BIER flow identifiers (e.g., MRP IDs) 702 and BIER replication neighbor (NBR) lists 704. BRCT 700 comprises one or more entries 706 comprising a BIER flow identifier 702 and a replication neighbor (NBR) list 704. The BIER flow identifier 702 identifies a BFIR for a multicast group. In an embodiment, the BIER flow identifier 702 is in the format of BFIR-id:MRP ID, where the BFIR-id identifies a BFIR for a multicast group and the MRP ID is a label for the multicast group. The replication NBR list 704 is a next-hop list that is associated with the BIER flow identifier 702. The replication NBR list 704 may be generated based on a bit string and a BIER routing table, for example, BIER routing table 500 in FIG. 5.

Referring to FIG. 1 as an example, BRCT 700 may be used by network node 104. BRCT 700 comprises a first entry 706A that corresponds with a first multicast group with network nodes 108, 110, and 112 as BFERs and a second entry 706B that corresponds with a second multicast group with network nodes 108 and 112 as BFERs. In the first entry 706A, the BIER flow identifier 702 identifies network node 102 as the BFIR for the first multicast group and the replication NBR list 704 identifies network nodes 110 and 106 as next-hops. Network node 110 is the next-hop to reach network node 110 and network node 106 is the next-hop to reach network nodes 108 and 112. In the second entry 706B, the BIER flow identifier 702 identifies network node 102 as the BFIR for the second multicast group and the replication NBR list 704 identifies network node 106 as a next-hop. Network node 106 is the next-hop to reach network nodes 108 and 112.

Returning to FIG. 7, BRCT 700 may be generated based on a control packet (i.e., the bit string of the packet) and used for forwarding data packets in the data plane. For example, a BFIR may send a data packet with a bit string and without a multicast payload as a control plane packet to an adjacent BFR. The BFR uses the control plane data packet to generate BRCT 700 and inserts an entry for forwarding data packets in the data plane. The BFR swaps data packets by looking at the BRCT 700 when the BFIR sends data packets encapsulated with an MRP ID in the BIER header to the BFR.

Figure 8:
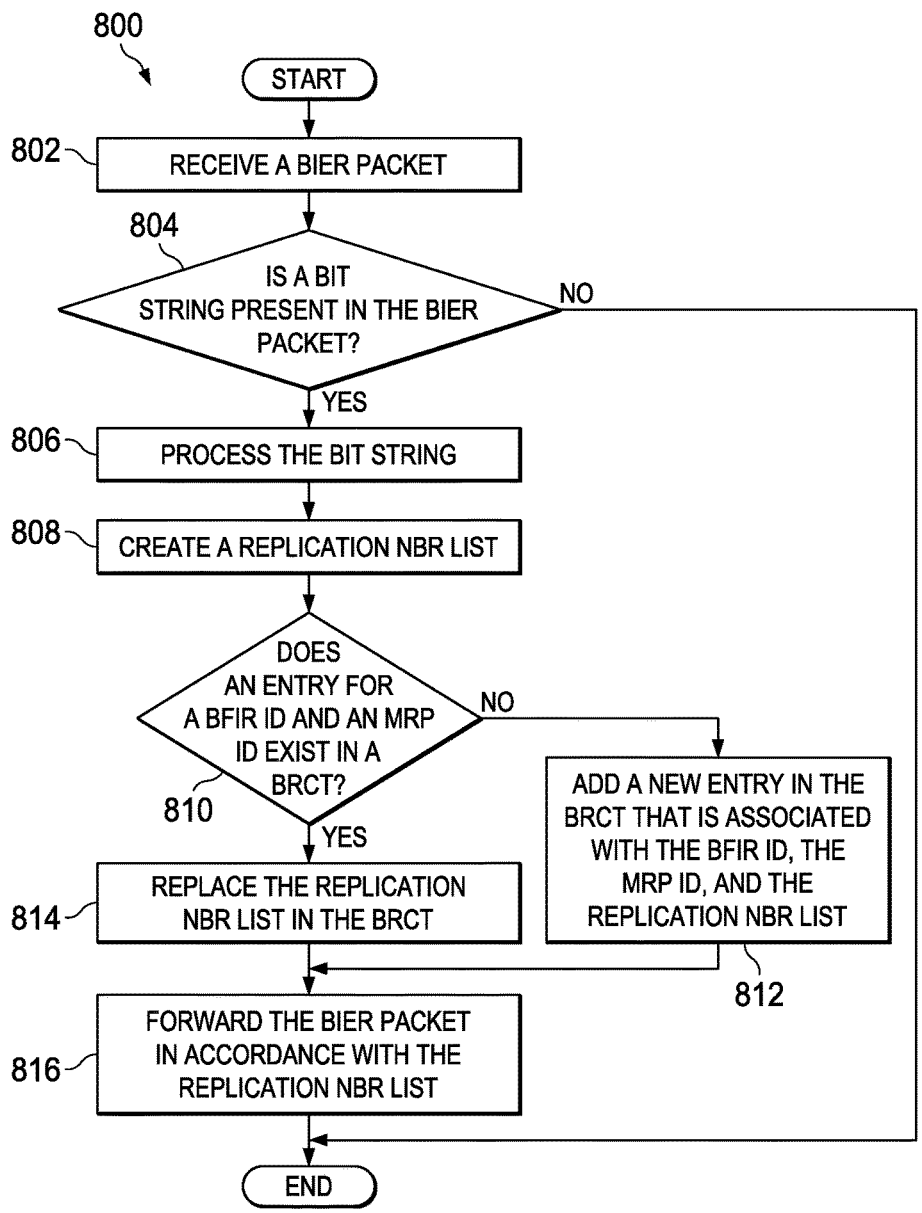
FIG. 8 is a flowchart of an embodiment of a BFR forwarding method.

FIG. 8 is a flowchart of an embodiment of a BFR forwarding method 800. Specifically, method 800 may be employed in a network configured to implement BIER such as network 100 in FIG. 1. Method 800 is implemented by a BFR (e.g., network node 104 or 106 in FIG. 1) to generate entries in a BRCT, for example, BRCT 700 in FIG. 7, and to transport multicast traffic over a network using the BRCT.

At step 802, the BFR receives a BIER packet. For example, the BFR may receive the BIER packet from a BFIR or another BFR. At step 804, the BFR determines whether a bit string is present in the header of the BIER packet. For example, the BFR may check a flag bit in the header of the BIER packet to determine whether a bit string is present in the header of the BIER packet. The BFR proceeds to step 806 when a bit string is present. Otherwise, the BFR terminates method 800 and may forward the BIER packet using any suitable protocol. At step 806, the BFR processes the bit string in the BIER packet. In an embodiment, the BFR determines the next hops that the control packet needs to be replicated to and a new bit string for each of the next hops, sends a control packet with the updated bit string to each of the next hops, and creates or updates the replication NBR list in the BRCT for the corresponding BFIR and MRP ID index. For example, the BFR may create the replication NBR list when an entry for the BFIR ID and the MRP ID in the BRCT does not exist. The BFR may determine the SI for the BIER packet, use the bit string and the SI as an index for a BIER forwarding table (e.g., BIER forwarding table 600 in FIG. 6), determine an F-BM and BFR-NBR from the BIER forwarding table, copy the BIER packet, and update the bit string of the original BIER packet using the F-BM. Additional details for processing the BIER packet are described in IETF draft titled, "Multicast using Bit Index Explicit Replication," by I J. Wijnands, et al., published on Sep. 22, 2014. At step 808, the BFR creates a replication NBR list. The replication NBR list may be generated based on the bit string and a BIER routing table (e.g., BIER routing table 500 in FIG. 5).

At step 810, the BFR determines whether an entry exists in a BRCT (e.g., BRCT 700 in FIG. 7) using a BFIR ID and an MRP ID. For example, the BFR may obtain a BFIR ID and an MRP ID from the header of the BIER packet, concatenate the BFIR ID and the MRP ID, and perform a look up using the concatenation as an index for BRCT. The BFR proceeds to step 812 when the BFR determines that an entry exists in the BRCT. Otherwise, the BFR proceeds to step 814. At step 812, the BFR adds a new entry in the BRCT that is associated with the BFIR ID, the MRP ID, and the replication NBR list. For example, the BFR may concatenate the BFIR ID and the MRP ID and use the concatenation as an index for the new entry and the replication NBR list. At step 816, the BFR forwards the BIER packet in accordance with BRCT and the replication NBR list. The BFR uses the replication NBR list that is associated with the BFIR ID and the MRP ID to determine the next-hops for forwarding the BIER packet. Any suitable forwarding techniques may be employed to forward the BIER packet as would be appreciated by one of ordinary skill in the art. Examples of forwarding techniques include, but are not limited to, load balancing, equal costs multiple path (EMCP), tunneling, unicasting, and fast rerouting.

Returning to step 810, the BRF proceeds to step 814 when the BFR determines that an entry does not exist in the BRCT. At step 814, the BFR replaces the replication NBR list in the BRCT that corresponds with the entry for the BFIR ID and the MRP ID and proceeds to step 816.

In an embodiment, the BRCT is maintained to clean entries in the BRCT. For example, an operator may set a default entry expire timer. Each BFR is configured to keep a timer for each entry, to scan the BRCT periodically, and to clear entries that exceed the entry expire timer. As an example, a BFIR may need to resend a bit string during transport, for example, because the topology of a multicast group has changed such as when a new BFER joins the multicast group. The BFIR resends the bit string again to allow the BFR to compute the new replication path. A bit string may also be resent for other conditions such as when (*, G) group membership condition change, after an IGP topology changes, or when an interval between two packets with the same MRP ID is longer than the BRCT entry expire entry.

Table 1 is an embodiment of pseudocode for a BFR forwarding process that is similar to method 800 in FIG. 8.

TABLE 1 an embodiment of pseudocode for a BFR forwarding process

Figure 9:
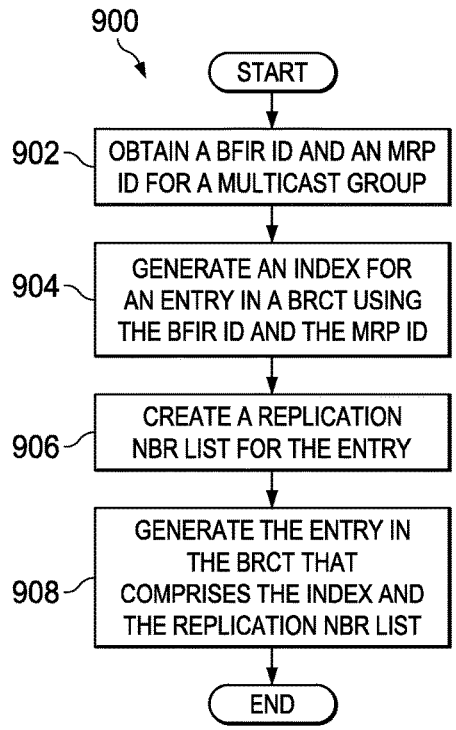
FIG. 9 is a flowchart of another embodiment of a BFR forwarding method.

Procedure on BFR: Upon receiving a BIER packet,
If Bit String is present on BIER packet,
    Process Bit String according the process specified
        in Section 6.5 of BIER architecture [BEIR] and
        create a replication NBR list according to the string and BFR routing table;
        Check the entry in BRCT using BFIR ID and MRP ID
    on the packet;
    If the entry exists,
        replace the replication NBR list and resetthe timer;
    Else
        add a new entry in the table with the key of BFIR-ID:MRP-ID and the replication NBR list;
        set the timer for the entry;
    End if
Else
    Perform a BRCT lookup w/ BRIR ID and MRP ID on the packet.
    Forward the packet according the Replication NBR list on the corresponding entry and reset the timer for the entry;
End if FIG. 9 is a flowchart of another embodiment of a BFR forwarding method 900. Specifically, method 900 may be employed in a network configured to implement BIER such as network 100 in FIG. 1. Method 900 is implemented by a BFR (e.g., network node 104 or 106 in FIG. 1) to generate entries in a BRCT, for example, BRCT 700 in FIG. 7, for transporting multicast traffic over a network using the BRCT.

At step 902, the BFR obtains a BFIR ID and an MRP ID for a multicast group. For example, the BFR may process the header of a BIER packet to extract or generate the BFIR ID and the MRP ID. In an embodiment, the MRP ID may be generated and assigned by the BFR. At step 904, the BFR generates an index for an entry in a BRCT using the BFIR ID and the MRP ID. The index may be generated by concatenating the BFIR ID and the MRP ID. Alternatively, the index may be generated using technique with the BFIR ID and the MRP ID. At step 906, the BFR creates a replication NBR list for the entry. The replication NBR list may be generated based on a bit string in the header of a BIER packet and a BIER routing table (e.g., BIER routing table 500 in FIG. 5). At step 908, the BFR generates the entry in the BRCT that comprises the index and the replication NBR list.

Figure 10:
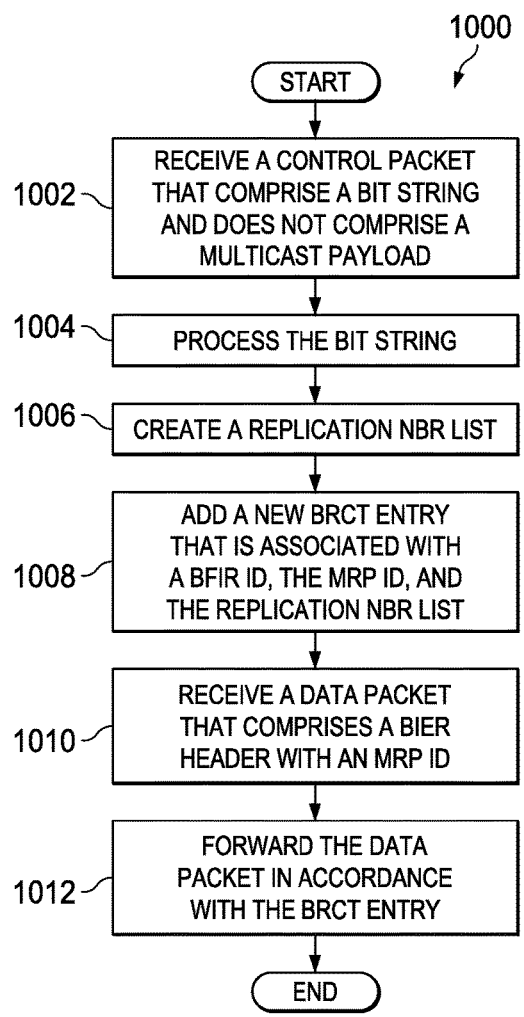
FIG. 10 is a flowchart of another embodiment of a BFR forwarding method.

FIG. 10 is a flowchart of another embodiment of a BFR forwarding method 1000. Specifically, method 1000 may be employed in a network configured to implement BIER such as network 100 in FIG. 1. Method 1000 is implemented by a BFR (e.g., network node 104 or 106 in FIG. 1) to generate entries in a BRCT (e.g., BRCT 700 in FIG. 7) using a control packet and to transport data packets over a network using the BRCT. As such, method 1000 provides a separate BIER control plane and a data plane using existing hardware.

At step 1002, the BFR receives a control packet that comprises a bit string and does not comprise a payload (e.g., a multicast payload). For example, the BFR may receive the control packet from a BFIR or another BFR. At step 1004, the BFR processes the bit string in the control packet. For example, the BFR may determine the SI for the control packet, use the bit string and the SI as an index for a BIER forwarding table (e.g., BIER forwarding table 600 in FIG. 6), determine an F-BM and BFR-NBR from the BIER forwarding table, copy the control packet, and update the bit string of the original control packet using the F-BM. Additional details for processing the control packet are described in IETF draft titled, "Multicast using Bit Index Explicit Replication," by I J. Wijnands, et al., published on Sep. 22, 2014. At step 1006, the BFR creates a replication NBR list. The replication NBR list may be generated based on the bit string and a BIER routing table (e.g., BIER routing table 500 in FIG. 5). At step 1008, the BFR adds a new entry in the BRCT that is associated with a BFIR ID, a MRP ID for the BFR, and the replication NBR list. For example, the BFR may concatenate the BFIR ID and the MRP ID and use the concatenation as an index for the new entry and the replication NBR list. At step 1010, the BFR receives a data packet that comprises the MRP ID for the BFR and a payload (e.g., a multicast payload). For example, the BFR may receive the BIER packet from a BFIR or another BFR. At step 1012, the BFR forwards the data packet in accordance with BRCT and the replication NBR list. The BFR uses the replication NBR list that is associated with the BFIR ID and the MRP ID to determine the next-hops for forwarding the data packet. Any suitable forwarding techniques may be employed to forward the data packet as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A data packet forwarding method comprising:
    receiving, by a network node, a data packet that comprises a bit string, a Bit Index Explicit Replication (BIER) forwarding ingress router (BFIR) identifier (ID), and a multicast replication path (MRP) ID, wherein the BFIR ID identifies an ingress network node for a multicast group, and wherein the MRP ID identifies the multicast group;
    computing, by the network node, a set of next hops and an updated bit string based on the bit string and a replication neighbor (NBR) list;
    updating, by the network node, an entry in a BIER Replication Path Cache Table (BRCT) employed in the network node using the BFIR ID and the MRP ID, wherein the entry identifies the replication NBR list associated with the BFIR ID and the MRP ID; and forwarding, by the network node, the data packet with the updated bit string to each next hop.

2. The method of claim 1, wherein the replication NBR list identifies one or more next-hop network nodes, and wherein forwarding the data packet comprises sending the data packet to the one or more next-hop network nodes.

3. The method of claim 1, further comprising generating, by the network node, a new entry using the BFIR ID and the MRP ID in the BRCT when the entry in the BRCT does not exist.

4. The method of claim 1, further comprising setting, by the network node, an entry expire timer for the entry.

5. The method of claim 4, further comprising removing, by the network node, the entry when the entry expire timer expires.

6. The method of claim 1, further comprising creating, by the network node, the replication NBR list for the entry using the bit string.

7. The method of claim 1, further comprising creating, by the network node, the entry in the BRCT when the entry in the BRCT does not exist.

8. A data packet forwarding method comprising:
receiving, by a network node, a control packet that comprises a bit string, a Bit Index Explicit Replication (BIER) forwarding ingress router (BFIR) identifier (ID), and a multicast replication path (MRP) ID, wherein the BFIR ID identifies an ingress network node for a multicast group, wherein the MRP ID identifies the multicast group, and wherein the control packet does not comprise a multicast payload;
generating, by the network node, an entry in a BIER Replication Path Cache Table (BRCT) employed in the network node using the BFIR ID and the MRP ID, wherein the entry identifies a replication neighbor (NBR) list associated with the BFIR ID and the MRP ID;
receiving, by a network node, a data packet that comprises the MRP ID; and
forwarding, by the network node, the data packet in accordance with the entry in the BRCT.

9. The method of claim 8, further comprising, by the network node, creating the replication NBR list for the entry using the bit string.

10. The method of claim 8, wherein forwarding the data packet does not modify the bit string.

11. The method of claim 8, further comprising setting, by the network node, an entry expire timer for the entry.

12. The method of claim 11, further comprising removing, by the network node, the entry when the entry expire timer expires.

13. The method of claim 8, further comprising forwarding, by the network node, the control packet, wherein the control packet is forwarded in a control plane, and wherein the data packet is forwarded in a data plane.

14. A data packet forwarding method comprising:
obtaining, by a network node, a Bit Index Explicit Replication (BIER) forwarding ingress router (BFIR) identifier (ID) and a multicast replication path (MRP) ID, wherein the BFIR ID identifies an ingress network node for a multicast group, and wherein the MRP ID identifies the multicast group;
generating, by the network node, an index for an entry in a BIER Replication Path Cache Table (BRCT) employed in the network node using the BFIR ID and the MRP ID; and
generating, by the network node, the entry in the BRCT that comprises the index and a replication neighbor (NBR) list associated with the index, wherein the replication NBR list identifies one or more next-hop network nodes.

15. The method of claim 14, wherein obtaining the BFIR ID and the MRP ID comprises processing a header for a BIER packet.

16. The method of claim 15, further comprising creating, by the network node, the replication NBR list using a bit string in the header for the BIER packet.

17. The method of claim 14, wherein generating the index comprises concatenating the BFIR ID and the MRP ID.

18. The method of claim 14, wherein obtaining the MRP ID comprises generating the MRP ID for the multicast group.

19. The method of claim 14, further comprising setting, by the network node, an entry expire timer for the entry.

20. The method of claim 19, further comprising removing, by the network node, the entry when the entry expire timer expires.

* * * * *